United States Patent [19]

Romano

[11] Patent Number: 4,787,266
[45] Date of Patent: Nov. 29, 1988

[54] ADJUSTABLE TOE CLIP FOR BICYCLE PEDALS

[75] Inventor: Antonio Romano, Padua, Italy

[73] Assignee: Campagnolo S.P.A., Vicenza, Italy

[21] Appl. No.: 84,904

[22] Filed: Aug. 12, 1987

[30] Foreign Application Priority Data

Sep. 5, 1986 [IT] Italy .................. 22928/86[U]

[51] Int. Cl.⁴ .................. G05G 1/14; A44B 11/12; B68B 5/00
[52] U.S. Cl. .................. 74/594.6; 24/170; 24/581
[58] Field of Search .................. 74/594.6, 594.4; 24/170, 191, 581, 541; 36/131, 130

[56] References Cited

U.S. PATENT DOCUMENTS

| 625,156 | 5/1899 | Duffy | 74/594.6 |
|---|---|---|---|
| 981,946 | 1/1911 | Robinson | 24/541 |
| 1,149,905 | 8/1915 | Gass | 24/541 |
| 1,336,129 | 4/1920 | Cass et al. | 24/541 |
| 3,026,592 | 3/1962 | Dudley | 24/541 |
| 4,172,392 | 10/1979 | Foster | 74/594.6 |
| 4,327,602 | 5/1982 | Le Bec | 74/594.6 |
| 4,386,472 | 6/1983 | Shimano | 74/594.6 |
| 4,442,732 | 4/1984 | Okajima | 74/594.6 |
| 4,638,685 | 1/1987 | Cigolini | 74/594.6 |

FOREIGN PATENT DOCUMENTS

| 0008466 | 3/1980 | European Pat. Off. | 74/594.6 |
|---|---|---|---|
| 2148808 | 6/1985 | United Kingdom | 74/594.6 |

Primary Examiner—Richard E. Moore
Assistant Examiner—Vinh Luong
Attorney, Agent, or Firm—Young & Thompson

[57] ABSTRACT

A toe clip for bicycle pedals, comprising a plate of flexible material adapted to be fixed to one side of a bicycle pedal body and extending forward and then being bent rearward to enclose the toe of a shoe. A strap is surrounded by an eyelet secured to the rearwardly bent portion of the plate. The eyelet is in the form of a loop having two free superposed ends, and a lever presses together the two ends of the eyelet with the end of rearwardly extending portion between them thereby to permit selective positioning and locking of the flexible plate and the eyelet in any of a plurality of selected adjusted positions relative to each other. The end of the eyelet and the rearwardly extending end of the flexible plate have mating projections and recesses disposed in a series extending in the direction of adjustment of the flexible plate and eyelet relative to each other, thereby to predetermine the positions of adjustment.

2 Claims, 2 Drawing Sheets

ADJUSTABLE TOE CLIP FOR BICYCLE PEDALS

BACKGROUND OF THE INVENTION

This invention relates to a toe clip for bicycle pedals, the improved structure of which allows ready and simple adjustment and thus results in considerable functional advantages and particularly comfortable use by cyclists.

Toe clips are simple known devices used on racing and competition bicycles, to secure the cyclist's feet to the bicycle pedals in the most suitable position.

They consist substantially of a flexible metal plate which starts from one of the long sides of the pedal body and extends firstly forwards in an outward direction and is then bent rearwards to enclose the toe of the shoe against which it is tightened, at the level of the instep, by means of a transverse strap.

Toe clips of different dimensions are available commercially, to fit different sizes of cyclist's shoes. In contrast, the toe clip described in the present invention can, as a single type, be properly adpted to all sizes as it can be adjusted not only longitudinally (by means of a slot which enables the toe clip to the fixed to the pedal body in the most suitable position) but also in height by means of an improved rapid fixing device which enables the position of the eyelet through which the strap is passed to be adjusted.

SUMMARY OF THE INVENTION

More precisely, the toe clip according to the invention, of the type comprising a plate of metal (or other suitable flexible material) fixed to one side of the pedal body, and extending firstly forwards in an outward direction and then being bent rearwards to enclose the toe of the shoe, against which it is tightened at the level of the instep by means of a strap, is characterised in that the rearwardly bent part of the flexible plate is connected to the strap by a device comprising the strap eyelet and means for its rapid fixing to said plate in an adjustable position.

Said device consists advantageously of a plate which is bent as a loop to form said eyelet and of which the superposed ends can be pressed together by lever means after interposing the toe clip plate between said ends in an adjustable position in order to connect said eyelet to said plate in the required position.

BRIEF DESCRIPTION OF THE DRAWINGS

A preferred embodiment of the invention is illustrated by way of example on the accompanying drawings, in which.

DESCRIPTION OF THE PREFERRED EMBODIMENT

Figure 1:
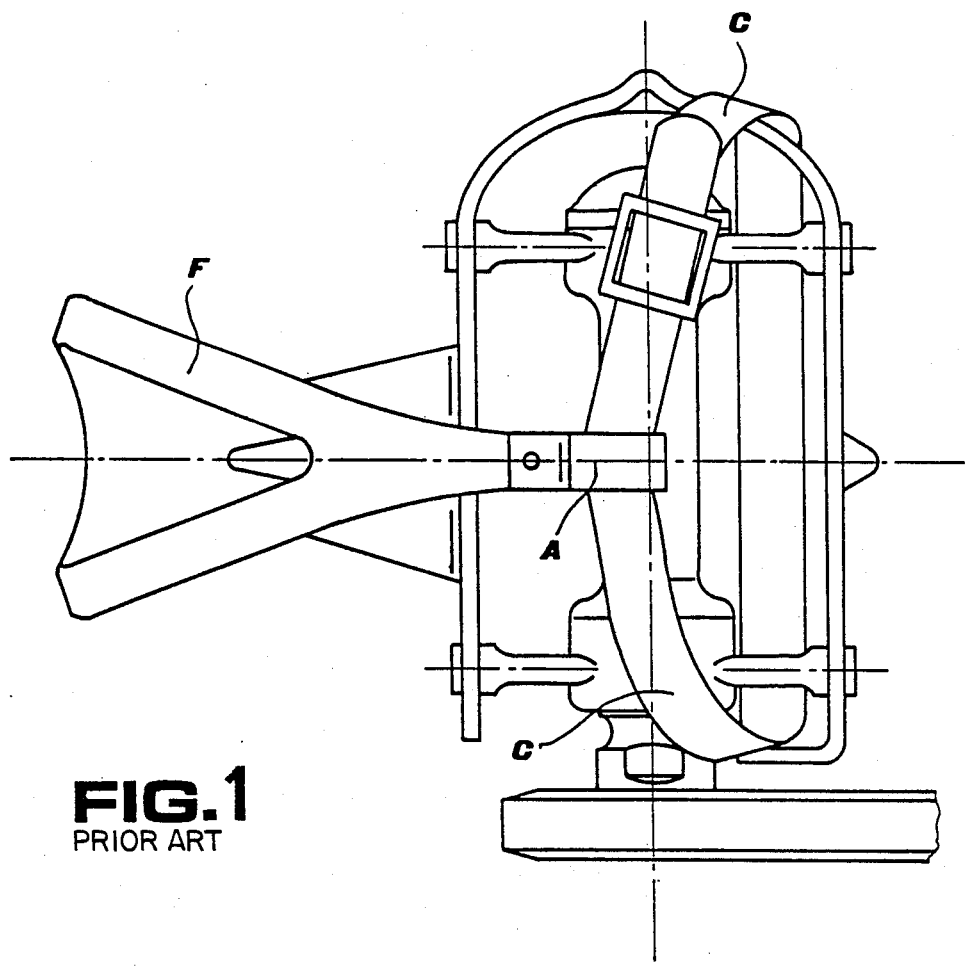
FIG. 1 is a plan view of a toe clip of conventional type.
Figure 2:
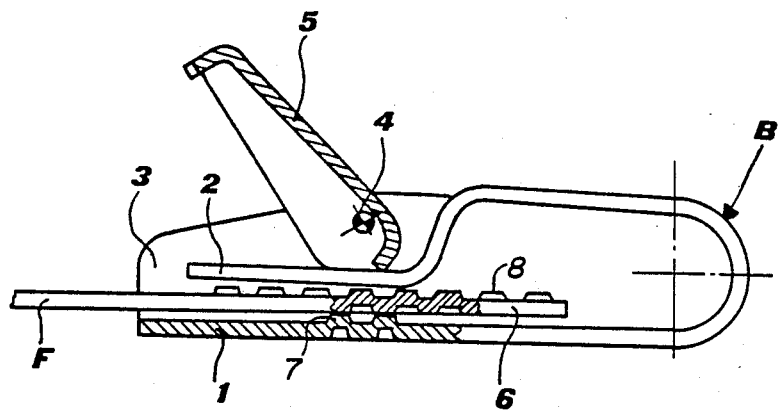
FIG. 2 is a partly sectional side view of a device according to the invention shown in its open position, for fitting to a toe clip such as that shown in FIG. 1.
Figure 3:
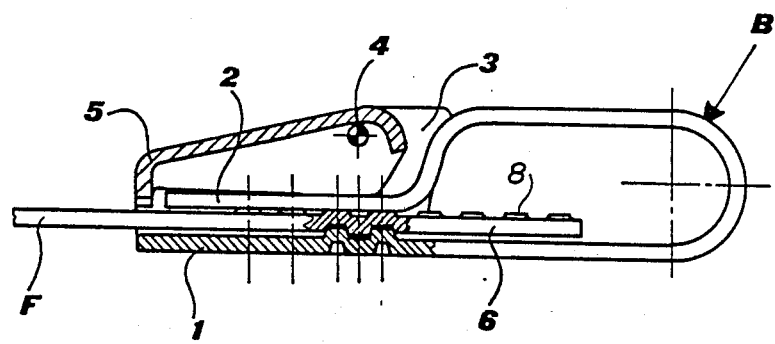
FIG. 3 shows the device of FIG. 2 in its closed position.

With reference to the drawings, the eyelet through which the strap C of a toe clip F passes is not formed in the conventional manner shown in FIG. 1 by bending back the constituent plate of the toe clip F at A, but instead is connected to it by a device characteristic of the present invention and shown in FIGS. 2 and 3.

This device is composed of a plate of metal (or other suitable material) bent into a loop to form an eyelet B for the strap.

The plate which forms the eyelet B comprises two superposed ends 1 and 2, the first of which has lateral edges 3 formed integrally therewith and bent at a right angle, and the second of which has an S profile to form a sufficiently large eyelet B while at the same time being very close and substantially parallel to the first end, as shown in FIGS. 2 and 3.

An eccentric lever 5 is pivoted on a pin 4 extending between the bent edges 3 of the end 1 and is able, when in the closed position (FIG. 3), to press together the two ends 1 and 2 of the plate which forms the device.

This latter is mounted on the end 6 of the plate forming the toe clip F instead of the conventional eyelet A, by inserting the end 6 of the plate forming the toe clip F between the ends 1 and 2 of the plate forming the eyelet B when the device is in its open position shown in FIG. 2.

When the device is closed by rotating the eccentric lever 5 in an anticlockwise direction so that it moves to the position shown in FIG. 3, the plate 6 of the toe clip F becomes locked (in the required position) between the ends 1 and 2 of the plate which forms the eyelet B of said device.

To ensure secure fixing, a raised surface in the form of a number of retainer portions 7 of suitable shape easily formed by pressing, is provided on the end 1 of the plate of the device, and corresponding hollow retainer portions 8 are provided in the plate 6 of the toe clip F.

An adequate range of adjustment of the length of the toe clip is easily obtained by suitably choosing the dimensions and number of the retainer portions.

I claim:

1. In a toe clip for bicycle pedals, comprising a plate of flexible material adapted to be fixed to one side of a bicycle pedal body and extending forward and then being bent rearward to enclose the toe of a shoe, and a strap surrounded by an eyelet secured to the rearwardly bent portion of the plate; the improvement in which said eyelet is in the form of a loop having two free superposed ends, and lever means for pressing together said two ends with the end of said rearwardly bent portion between them thereby to permit selective positioning and locking of the flexible plate and the eyelet in any of a plurality of selected adjusted positions relative to each other.

2. A toe clip as claimed in claim 1, in which a said end of said eyelet and said end of said rearwardly bent portion of said flexible plate have mating projections and recesses disposed in a series extending in the direction of adjustment of the flexible plate and eyelet relative to each other, thereby to predetermine said adjusted positions.

* * * * *